US007926410B2

(12) United States Patent
Bair

(10) Patent No.: US 7,926,410 B2
(45) Date of Patent: Apr. 19, 2011

(54) HYDRAULIC CIRCUIT FOR SYNCHRONIZED HORIZONTAL EXTENSION OF CYLINDERS

(75) Inventor: Eugene C. Bair, Holland, MI (US)

(73) Assignee: J.R. Automation Technologies, L.L.C., Holland, MI (US)

( * ) Notice: Subject to any disclaimer, the term of this patent is extended or adjusted under 35 U.S.C. 154(b) by 476 days.

(21) Appl. No.: 12/108,038

(22) Filed: Apr. 23, 2008

(65) Prior Publication Data

US 2008/0271445 A1 Nov. 6, 2008

Related U.S. Application Data

(60) Provisional application No. 60/915,192, filed on May 1, 2007, provisional application No. 60/915,759, filed on May 3, 2007.

(51) Int. Cl.
*F15B 7/00* (2006.01)
*B60J 7/08* (2006.01)

(52) U.S. Cl. ........................................ 91/494; 60/484

(58) Field of Classification Search .................... 60/473, 60/475, 476, 546, 484; 91/515, 532
See application file for complete search history.

(56) References Cited

U.S. PATENT DOCUMENTS

| | | | |
|---|---|---|---|
| 1,831,238 A | | 11/1931 | Ferris |
| 2,499,563 A | | 3/1950 | Bill |
| 2,983,256 A | | 5/1961 | Seeloff |
| 2,997,849 A | | 8/1961 | Shimanckas |
| 3,157,032 A | | 11/1964 | Herpich |
| 3,257,810 A | | 6/1966 | Hanni |
| 3,316,817 A | | 5/1967 | Ellis |
| 3,590,581 A | | 7/1971 | Bianchi |
| 3,625,115 A | | 12/1971 | Tani et al. |
| 3,643,725 A | | 2/1972 | Fismer |
| 3,680,339 A | | 8/1972 | Hayakawa |
| 3,769,881 A | | 11/1973 | Aoki |
| 3,776,300 A | | 12/1973 | Fismer |
| 3,783,620 A | | 1/1974 | Moe |
| 3,832,852 A | | 9/1974 | Schmucket |
| 3,855,794 A | | 12/1974 | Meyer et al. |
| 4,006,664 A | | 2/1977 | Brown |
| 4,161,229 A | | 7/1979 | Mifsud |
| 4,164,122 A | | 8/1979 | Ward |
| 4,241,581 A | | 12/1980 | Chace |
| 4,251,993 A | | 2/1981 | Vancil |
| 4,351,153 A | | 9/1982 | Kosmala |
| 4,585,172 A | | 4/1986 | Gazzera |
| 4,624,126 A | | 11/1986 | Avila et al. |
| 5,141,112 A | | 8/1992 | Holbert |
| 5,320,047 A | | 6/1994 | Deurloo et al. |
| 5,390,586 A | | 2/1995 | Jones |
| 5,454,292 A | * | 10/1995 | Oudelaar ........................ 91/446 |
| 5,666,809 A | * | 9/1997 | Mentink ......................... 60/484 |
| 6,026,934 A | | 2/2000 | Deurloo |

(Continued)

*Primary Examiner* — Thomas E Lazo

(74) *Attorney, Agent, or Firm* — Price, Heneveld, Cooper DeWitt & Litton, LLP

(57) ABSTRACT

A hydraulic system for synchronized movement of multiple cylinders in a horizontal plane includes a bidirectional pump, a shuttle valve cross-connected between pump outlets, flow-control check valves, and control valves which combine to reduce the number of valves in the hydraulic circuit and to reduce total cost of components for the system. The shuttle valve of the hydraulic system provides fluid for resynchronizing extension and retraction of multiple cylinder assemblies without disconnection of lines, provides air removal without disconnection of lines, allows easy addition/refill of hydraulic fluid, and allows excellent control of the extendable cylinder assemblies.

10 Claims, 1 Drawing Sheet

U.S. PATENT DOCUMENTS

| | | | | |
|---|---|---|---|---|
| 6,052,952 | A * | 4/2000 | Frerichs et al. | 52/64 |
| 6,408,736 | B1 | 6/2002 | Holt et al. | |
| 7,047,738 | B2 | 5/2006 | Bair | |
| 7,134,280 | B2 | 11/2006 | Bair | |
| 2003/0140628 | A1 | 7/2003 | Gai | |
| 2004/0020197 | A1 | 2/2004 | Cray | |

* cited by examiner

HYDRAULIC CIRCUIT FOR SYNCHRONIZED HORIZONTAL EXTENSION OF CYLINDERS

CROSS REFERENCE TO RELATED APPLICATIONS

This application claims benefit under 35 U.S.C. §119(e) of provisional application Ser. No. 60/915,192, filed May 1, 2007, entitled HYDRAULIC CIRCUIT FOR SYNCRONIZED HORIZONTAL EXTENSION OF CYLINDERS, and also claims benefit under 35 U.S.C. §119(e) of provisional application Ser. No. 60/915,759, filed May 3, 2007, entitled HYDRAULIC CIRCUIT FOR SYNCRONIZED HORIZONTAL EXTENSION OF CYLINDERS, the entire contents of which are incorporated herein in their entirety.

BACKGROUND

The present invention relates to hydraulic circuits for extension of cylinders, and more particularly relates to synchronized extension of horizontally-extending cylinders.

The U.S. Pat. Nos. 7,047,738, 7,134,280, and 7,322,190 disclose synchronized hydraulic systems that effectively control synchronized extension of multiple cylinders such as on a lift table. Further, the systems can be re-synchronized, air-purged, and refilled without disconnecting lines. However, improvements are desired to lower cost, and to improve simplicity and operation such as by removing the number of components and the expensiveness of those components.

Thus, an apparatus and method are desired having the aforementioned advantages and solving the aforementioned problems.

SUMMARY OF THE PRESENT INVENTION

In one aspect of the present invention, a hydraulic system includes a plurality of cylinder assemblies oriented and adapted to be connected to an object for moving the object in a desired horizontal direction, and a synchronizer having a plurality of isolated chambers corresponding to the plurality of cylinder assemblies. The system further includes a bidirectional pump with a first outlet for pumping fluid to operate the system in a first direction and a second outlet for pumping fluid to operate the system in a second direction, and a reversible motor connected to the pump for reversibly driving the pump. A hydraulic circuit is operably connected to the cylinder assemblies, the isolated chambers, and the bidirectional pump. The circuit includes first and second branches connected to the first and second outlets, respectively, and to the cylinder assemblies for simultaneously extending or simultaneously retracting the cylinder assemblies. The hydraulic circuit further includes a shuttle valve operably connected between the first and second branches for delivering pressurized fluid from the first and second branches to selected other parts of the hydraulic circuit. By this arrangement, the pressurized fluid from the shuttle valve can be used to do one or more of the following: rebalance fluid in the isolated chambers of the synchronizer, resynchronize the cylinder assemblies, remove air from the hydraulic system, and/or refill fluid into a selected portion of the hydraulic circuit.

In another aspect of the present invention, a hydraulic system includes a plurality of cylinder assemblies adapted to be connected to and move an object in a desired horizontal direction; a synchronizer having a plurality of isolated chambers corresponding to the plurality of cylinder assemblies; a bidirectional pump with a first outlet for pumping fluid to operate the system in a first direction and a second outlet for pumping fluid to operate the system in a second direction; and a reversible motor connected to the pump for reversibly driving the pump. A hydraulic circuit operably connects the cylinder assemblies, the isolated chambers, and the bidirectional pump. The circuit includes first and second branches connected to the first and second outlets, respectively, and to the plurality of cylinder assemblies, and includes first and second flow controls to control a speed of extension of the cylinder assemblies by controlling a speed of oil flow through the first and second branches back toward the first and second outlets, respectively.

An object of the present system is to use a bidirectional pump in order to reduce the number of valves required in a hydraulic circuit.

A further object is to use a shuttle valve as part of a superior method of removing the air from a hydraulic system.

A further object is to use only a minimum number of check valves and other components to lock the slide operation in any position.

A further object is to address requirements of a horizontal hydraulic system where gravity has a lesser or different role than in a vertical system where gravity can affect system hydraulic pressures.

A further object is to provide a hydraulic system with reduced synchronizer operating volume.

A further object is to utilize flow control valves in main circuits of the hydraulic system where orifice flow control is used in a novel way for control of the system, and for air removal from the system.

These and other aspects, objects, and features of the present invention will be understood and appreciated by those skilled in the art upon studying the following specification, claims, and appended drawings.

DETAILED DESCRIPTION OF PREFERRED EMBODIMENTS

Figure 1:
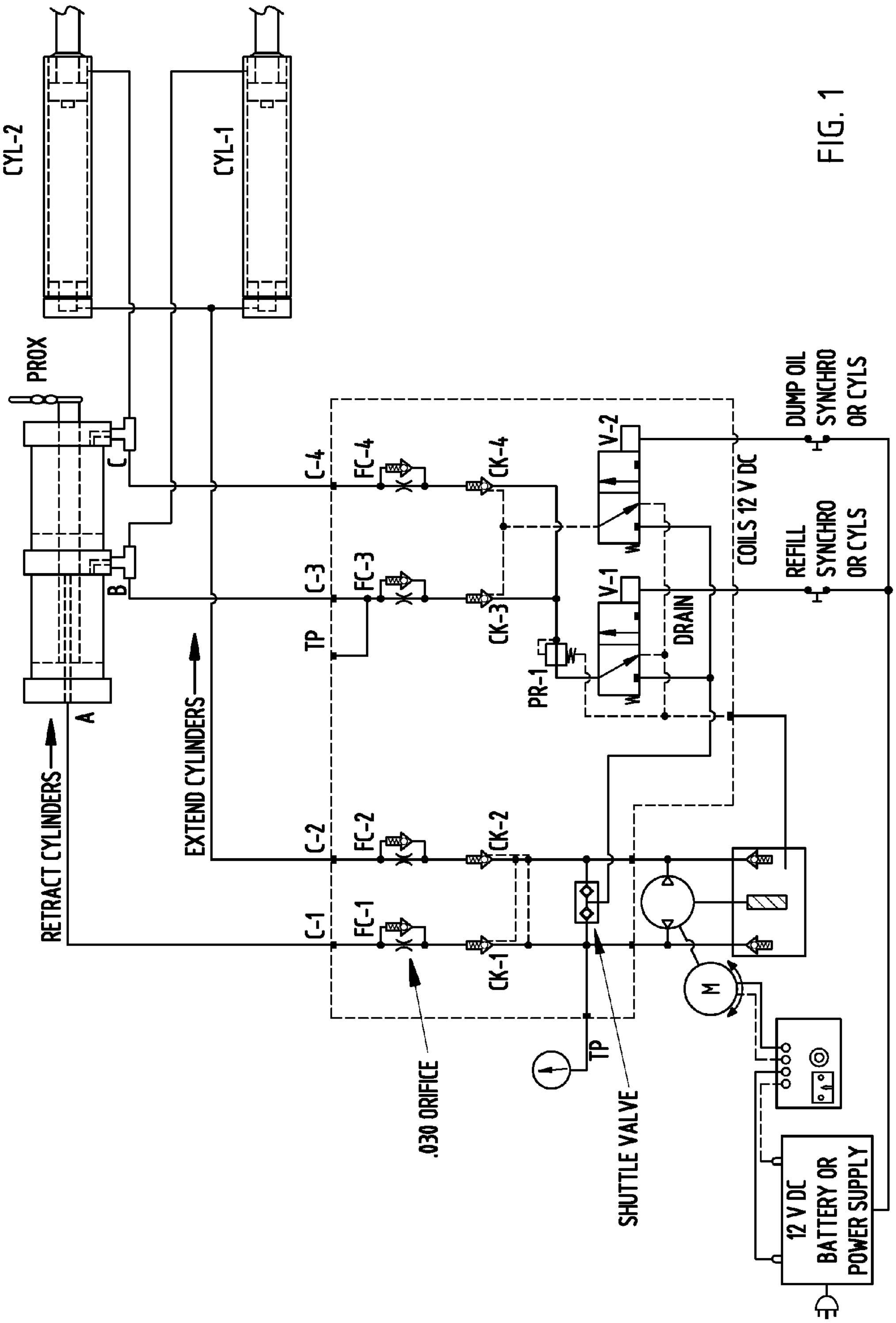
FIG. 1 is a hydraulic schematic diagram illustrating a hydraulic circuit and system embodying the present invention.

The present hydraulic system is for synchronized movement of two or more cylinders in a horizontal plane. This system is different from other systems such as those shown in Bair U.S. Pat. Nos. 7,134,280 and 7,047,738, and related Published Application No. 2006/0283321 for the following reasons: 1. The present system is lower cost and yet well-suited for horizontal extension of hydraulic cylinders, where gravity has limited effect on (or does not affect) fluid pressures nor cylinder operation, and where air removal is important. 2. The use of a bidirectional pump reduces the valve count. 3. The present system incorporates a shuttle valve and uses it in a novel way, which is believed to be significant because it provides a superior method of removing air from the system. 4. The system uses two check valves to lock the slide operation in any position, though this tends to limit use of this circuit to horizontal or near-horizontal movement only. The use of check valves does allow a reduced system operating pressure. 5. The use of flow control valves in the main circuits FC-1 and FC-2 with orifice flow control is different than the lift table circuit shown in the U.S. Pat. No. 7,134,280. This is significant from a control aspect, though it is noted that flow controls FC-3 and FC-4 may not be required in some installations. The illustrated flow control valves are believed to be important when correcting synchronization of multiple extendable cylinders, and in the air removable operation.

The present apparatus is directed to a system for moving two (or more) hydraulic cylinders in a synchronized manner. The system could be expanded to include any number of cylinders if such was required. The hydraulic circuit detail discussed in this document incorporates a bidirectional pump for carrying out the synchronized extension of the cylinders. A principle of this system is that hydraulic fluid is contained in two or more closed loop systems that all function at the same time. One element of the closed loop system is a device with a number of chambers with individual pistons connected together. Another element is an equal number of hydraulic cylinders. Each chamber is filled with hydraulic fluid and is connected to an individual cylinder. Any axial movement of either element in the connected pair will result in equal movement in the other element. This is essentially a master and slave system similar to that described in U.S. Pat. No. 7,134,280.

Referring to FIG. 1, the hydraulic pump that is shown is bidirectional and self-contained, and includes dual relief valves. Such bidirectional pumps are commercially available from several sources. The pump is operated by a bidirectional DC motor. The hydraulic system flow can be produced in either direction, by reversing the polarity of the motor. Any reversible motor can be used for this system; however, the choice of a DC motor is ideal for the recreational industry.

The circuit drawing shows the two cylinders in the extended position and the synchronizer device in the retracted position. In order to retract the cylinders the following action must occur.

1. Energize the motor and pump unit.
2. Operate the pump in the suitable direction to provide hydraulic oil flow thru CK-1 and FC-1 and thru port C-1.
3. Maintain the pump operation and the oil will be directed to port A at the synchronizer.
4. Maintaining the pump flow causes the synchronizer to extend and oil to flow from ports B and C. That oil will be directed thru piping to the rod end of the two cylinders. The cylinders will begin to retract. Because the oil being discharged from the Synchro chambers is of equal volume, the subsequent retracting motion of the cylinders will be synchronous.
5. Oil being forced from the cap end of the cylinders will combine and will be directed thru piping to C-2 and thru FC-2 and CK-2 to the reservoir automatically bypassing the pump and the relief valve.
6. The retracting motion and speed of the cylinders is controlled by the pressure setting of the pump unit and an orifice found in FC-2. The cylinder motion will stop when they reach their fully retracted position. The purpose and size of the orifice in FC-2 will be described in the discussion of cylinder extension action below.

To reverse the operation and extend the cylinders, the following action is required.

1. When the pump motor is reversed, that action than will cause oil to flow thru CK-2 and FC-2 and thru port C-2.
2. Oil from port C-2 will be directed to the cap end of the two cylinders
3. The cylinders will begin to extend and oil will be forced out of the rod end of the cylinders.
4. The oil from the cylinders will be directed thru tubing to the synchronizer ports B and C
5. The synchronizer will receive the oil from the two cylinders and will control the rate of cylinder extension by the rate of oil flow being forced out of port A on the Synchro.
6. Oil from port A is directed thru C-1, FC-1 and CK-1. Because the flow direction is toward the pump unit the check valve feature found in FC-1 will be forced close, preventing free flow. All of the oil trying to get thru the FC-1 is thus forced thru the orifice located in FC-1. The size of the orifice is selected to control the flow rate and therefore the rate of extension of the two horizontal cylinders. It has been determined that a diameter of 0.030 thousandths of an inch is suitable in most cases, however, the orifice size can be whatever is required for each application of this system.
7. Continuing to direct pump oil to the cap end of two cylinders will fully extend the two cylinders. Because of the oil being delivered to the Synchro ports B and C, from the cylinders, the Synchro will be forced to its fully retracted position.

Examining the circuits involved in both retract and extend cylinder systems you will observe CK-I and CK-2. These are pilot-operated check valves and their purpose in the circuit is to prevent the two horizontal cylinders from drifting out of position. The two cylinders can be stopped in any position and the two check valves will keep that position firmly in place. The check valves will open to allow cylinder movement only if pump pressure is present in the system.

The two flow controls FC-1 and FC-2 are in the circuit to control the speed of the cylinders. The method used for speed control has been discussed in the above paragraphs. What has been described above is a synchronized system that will cause two cylinders to extend and retract in unison regardless of reasonable load unbalances. Additionally, included in the schematic, is the means of removing trapped air and a method to resynchronize the cylinder action if slight leakage or other anomaly occurs in the system.

The following will describe these systems:

To resynchronize the cylinder motion, the following action should be take place.

1. Start the pump and extend or retract the cylinders as required. Stop the pump with the cylinders approximately 30% from full extension.
2. Simultaneously energize V-2 and the pump to extend the cylinders.
3. The pump pressure/flow will go thru CK-2 and FC-2 thru C-2 and to the cap end of the two cylinders. Pump pressure will also shift the shuttle valve and oil will be directed to P port of V-1 and V-2.
4. Because V-2 is energized, oil under pressure will enter the pilot ports on check valves CK-3 and CK-4.
5. CK-3 and CK-4 will open and oil from the rod end of the cylinders will flow thru the check valves, thru PR-1 and thru V-I to the reservoir. Oil flow will stop when the cylinders are fully extended.
6. Oil will also enter ports B and C on the synchronizer and the oil will cause the Synchro to start to retract. The orifice located in FC-1 will keep the Synchro from fully retracting.
7. When two cylinders are fully extended, stop the pump.

Shut off V-1 and energize V-2, start the pump to extend the cylinders. Because the cylinders are already extended the cylinders will not move. The oil will also be directed to ports B and C on the Synchro and the Synchro will retract. Keep the pump on until the Synchro is fully retracted. Shut off the pump and shut off all valves. The system is now ready to use.

If it is suspected that air is present in the system then the following steps can be taken to remove air from the system.

1. Turn on the pump and fully retract the cylinders and turn off the pump.

2. Turn on V-2 and the pump. The pump should be operated in the direction to extend the cylinders. Keep the pump on until the cylinders are fully extended. Turn off the pump and V-2.
3. Turn on V-2 and operate the pump to retract the cylinders. This action will cause oil to go thru CK-1 and FC-1 thru C-1 to the port A on the Synchro. Oil will also shift the shuttle valve and that action will cause oil to go thru V-2 and open the check valves CK-3 and CK-4.
4. Because CK-3 and CK-4 are now held open the oil from the Synchro ports B and C will now go thru FC-3 and FC-4, if present, then thru the CK-3 and CK-4, thru PR-1 and V-2 to the reservoir. (If present, FC-3 and FC-4 control the speed of resynchronization.) If the pump is maintained "on," the synchronizer will fully extend, causing most of the oil in the Synchro to go to the reservoir instead of to the cylinders. When the Synchro is fully extended, turn off the pump and V-2.
5. To get the Synchro back to home position, turn on V-1 and operate the pump in the extend cylinders direction. The oil will now go thru CK-2 and FC-2 thru C-2 and to the cap end of the cylinders. Oil will also shift the shuttle valve and cause oil to go thru V-1 and PR-1 thru CK-3 and CK-4 to ports B and C on the Synchro.
6. Oil going to the ports B and C will force the Synchro back home and at the same time the cylinders will be driven to the fully extended position.

When the system is fully in home position with all valves shut off, the system should be ready for use. The air removable method can be repeated as many times as thought necessary to satisfy performance.

As will be recognized by persons skilled in the art, the shuttle valve is adapted to receive hydraulic fluid from whichever pump outlet is pressurized, and deliver the pressurized fluid to an auxiliary branch of the hydraulic circuit (also called herein a "resynchronization-and-refill branch"). The auxiliary branch routes the hydraulic fluid through control valve V-1 (which controls refill of the synchronizer and resynchronization of the cylinder assemblies, as described above) and control valve V-2 (which controls dumping of hydraulic fluid from the synchronizer and from the cylinder assemblies, as described above), and through checks CK-3 and CK-4 and through optional flow controls FC-3 and FC-4 to selected locations in the hydraulic circuit in order to do one or more of the following: rebalance fluid in the isolated chambers of the synchronizer, resynchronize the cylinder assemblies, remove air from the hydraulic system, and/or refill fluid into a selected portion of the hydraulic circuit.

It is to be understood that variations and modifications can be made on the aforementioned structure without departing from the concepts of the present invention, and further it is to be understood that such concepts are intended to be covered by the following claims unless these claims by their language expressly state otherwise.

The embodiments of the invention in which an exclusive property or privilege is claimed are defined as follows:

1. A hydraulic system comprising:

a plurality of cylinder assemblies oriented and adapted to be connected to an object for moving the object in a desired horizontal direction;

a synchronizer having a plurality of isolated chambers corresponding to the plurality of cylinder assemblies;

a bidirectional pump with a first outlet for pumping fluid to operate the system in a first direction and a second outlet for pumping fluid to operate the system in a second direction;

a reversible motor connected to the pump for reversibly driving the pump; and a hydraulic circuit operably connecting the cylinder assemblies, the isolated chambers, and the bidirectional pump; the circuit including first and second branches connected to the first and second outlets, respectively, and to the cylinder assemblies for simultaneously extending or simultaneously retracting the cylinder assemblies; the hydraulic circuit further including a shuttle valve operably connected between the first and second branches for delivering pressurized fluid from the first and second branches to selected other parts of the hydraulic circuit, whereby the pressurized fluid from the shuttle valve can be used to do at least one of the following: rebalance fluid in the isolated chambers of the synchronizer, resynchronize the cylinder assemblies, remove air from the hydraulic system, and/or refill fluid into a selected portion of the hydraulic circuit.

2. The hydraulic system of claim 1, wherein the first and second branches each include check valves to lock extension of the cylinder assemblies in a selected position.

3. The hydraulic system of claim 1, wherein the hydraulic circuit includes a resynchronization-and-refill branch operably connected to the cylinder assemblies, the shuttle valve being operably connected to selectively deliver fluid to the resynchronzation-and-refill branch.

4. The hydraulic system defined in claim 3, wherein the resynchronization-and-refill branch incorporates at least one flow control for controlling a speed of fluid flow in the resynchronization-and-refill branch.

5. The hydraulic system defined in claim 3, wherein the resynchronization-and-refill branch incorporates at a first valve for refilling the synchronizer and cylinder assemblies, and a second valve for dumping fluid from the synchronizer and cylinder assemblies.

6. A hydraulic system comprising:

a plurality of cylinder assemblies adapted to be connected to and move an object in a desired horizontal direction;

a synchronizer having a plurality of isolated chambers corresponding to the plurality of cylinder assemblies;

a bidirectional pump with a first outlet for pumping fluid to operate the system in a first direction and a second outlet for pumping fluid to operate the system in a second direction;

a reversible motor connected to the pump for reversibly driving the pump; and a hydraulic circuit operably connecting the cylinder assemblies, the isolated chambers, and the bidirectional pump; the circuit including first and second branches connected to the first and second outlets, respectively, and to the plurality of cylinder assemblies, and including first and second flow controls to control a speed of extension of the cylinder assemblies by controlling a speed of oil flow through the first and second branches back toward the first and second outlets, respectively, wherein the first and second branches include check valves to lock extension of the cylinder assemblies in a selected position.

7. A hydraulic system comprising:

a plurality of cylinder assemblies adapted to be connected to and move an object in a desired horizontal direction;

a synchronizer having a plurality of isolated chambers corresponding to the plurality of cylinder assemblies;

a bidirectional pump with a first outlet for pumping fluid to operate the system in a first direction and a second outlet for pumping fluid to operate the system in a second direction;

a reversible motor connected to the pump for reversibly driving the pump; and a hydraulic circuit operably connecting the cylinder assemblies, the isolated chambers, and the bidirectional pump; the circuit including first and second branches connected to the first and second outlets, respectively, and to the plurality of cylinder assemblies, and including first and second flow controls to control a speed of extension of the cylinder assemblies by controlling a speed of oil flow through the first and second branches back toward the first and second outlets, respectively including a shuttle valve interconnecting the first and second outlets of the pump for providing a source of fluid output regardless of which one of the first and second outlets is providing pressurized fluid.

8. A method comprising steps of:

providing a plurality of cylinder assemblies oriented and adapted to be connected to an object for moving the object in a desired horizontal direction;

providing a synchronizer having a plurality of isolated chambers corresponding to the plurality of cylinder assemblies;

providing a bidirectional pump with a first outlet for pumping fluid to operate the system in a first direction and a second outlet for pumping fluid to operate the system in a second direction;

providing a reversible motor connected to the pump for reversibly driving the pump;

providing a hydraulic circuit operably connecting the cylinder assemblies, the isolated chambers, and the bidirectional pump; the circuit including first and second branches connected to the first and second outlets, respectively, and to the cylinder assemblies for simultaneously extending or simultaneously retracting the cylinder assemblies; the hydraulic circuit further including a shuttle valve operably connected between the first and second branches for delivering pressurized fluid from the first and second branches to selected other parts of the hydraulic circuit; and selectively operating the shuttle valve to do at least one of the following: rebalance fluid in the isolated chambers of the synchronizer, resynchronize the cylinder assemblies, remove air from the hydraulic system, or refill fluid into a selected portion of the hydraulic circuit.

9. The method defined in claim 8, wherein the step of selectively operating the shuttle valve includes doing at least two of the following: rebalance fluid in the isolated chambers of the synchronizer, resynchronize the cylinder assemblies, remove air from the hydraulic system, or refill fluid into a selected portion of the hydraulic circuit.

10. The method defined in claim 8, including a step of operating the reversible motor, including reversing operation of the reversible motor.

* * * * *